(12) United States Patent
Mukai et al.

(10) Patent No.: US 9,679,668 B2
(45) Date of Patent: Jun. 13, 2017

(54) SPENT FUEL STORAGE RACK

(75) Inventors: Toshimasa Mukai, Kamakura (JP); Takao Sato, Yokohama (JP); Hidenobu Hasegawa, Yokohama (JP); Kaoru Takagi, Kashiwazaki (JP); Tetsuro Takeshita, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1613 days.

(21) Appl. No.: 13/263,343

(22) PCT Filed: Apr. 5, 2010

(86) PCT No.: PCT/JP2010/056181
§ 371 (c)(1),
(2), (4) Date: Dec. 2, 2011

(87) PCT Pub. No.: WO2010/116977
PCT Pub. Date: Oct. 14, 2010

(65) Prior Publication Data
US 2012/0082285 A1    Apr. 5, 2012

(30) Foreign Application Priority Data

Apr. 10, 2009  (JP) ................................. 2009-095441

(51) Int. Cl.
*G21C 19/07* (2006.01)
*A47C 31/00* (2006.01)

(52) U.S. Cl.
CPC ............ *G21C 19/07* (2013.01); *A47C 31/002* (2013.01)

(58) Field of Classification Search
CPC .......... G21C 19/07; G21C 19/40; G21F 5/012
(Continued)

(56) References Cited

U.S. PATENT DOCUMENTS

| 4,042,828 A * | 8/1977 | Rubinstein | G21C 19/07 |
| | | | 250/506.1 |
| 4,055,318 A * | 10/1977 | Duckett | A47B 57/18 |
| | | | 248/243 |

(Continued)

FOREIGN PATENT DOCUMENTS

| CN | 1039495 A | 2/1990 |
| CN | 1204564 C | 6/2005 |

(Continued)

OTHER PUBLICATIONS

Extended Search Report issued Jun. 6, 2013 in European Patent Application No. 10761676.5.

(Continued)

*Primary Examiner* — Jack W Keith
*Assistant Examiner* — Sharon M Davis
(74) *Attorney, Agent, or Firm* — Oblon, McClelland, Maier & Neustadt, L.L.P.

(57) ABSTRACT

A spent fuel storage rack that accommodates and stores spent fuels in a large number of cells formed in a grid pattern includes a flat rectangular plate-shaped base forming the bottom of the rack, columnar members extending upward from the four corners of the base, and at least a pair of upper and lower grid-shaped frame plates disposed above the base and fixed to and supported by the columnar members. Each of the cells is formed by assembling metal plates to which boron is added to a density greater than 1% into a polygonal tube, and the cells are arranged contiguously at fixed intervals in the grid-shaped frame plates.

6 Claims, 13 Drawing Sheets

(58) Field of Classification Search
USPC .................. 376/272, 287; 250/507.1, 506.1;
403/231, 346, 364, 373, 376, 380
See application file for complete search history.

(56) References Cited

U.S. PATENT DOCUMENTS

| | | | |
|---|---|---|---|
| 4,187,433 A * | 2/1980 | Zezza | 376/272 |
| 4,366,115 A * | 12/1982 | Schlumpf | G21C 19/07 |
| | | | 250/506.1 |
| RE31,661 E * | 9/1984 | Mollon | G21C 19/07 |
| | | | 250/507.1 |
| 5,096,656 A | 3/1992 | Moreau et al. | |
| 5,311,563 A | 5/1994 | Schabert et al. | |
| 6,118,838 A | 9/2000 | Robert et al. | |
| 6,577,699 B1 | 6/2003 | Minshall | |
| 2003/0174801 A1 | 9/2003 | Costas De La Pena et al. | |
| 2004/0011971 A1* | 1/2004 | Nicholson | G21C 19/40 |
| | | | 250/507.1 |

FOREIGN PATENT DOCUMENTS

| | | |
|---|---|---|
| DE | 27 30 850 A1 | 1/1979 |
| JP | 10 227890 | 8/1998 |
| JP | 11 64572 | 3/1999 |
| JP | 11 258387 | 9/1999 |
| JP | 2002 40192 | 2/2002 |
| JP | 2003 14882 | 1/2003 |
| JP | 2003 500667 | 1/2003 |
| JP | 2007 24609 | 2/2007 |

OTHER PUBLICATIONS

International Preliminary Report on Patentability and Written Opinion issued Nov. 15, 2011 in patent application No. PCT/JP2010/056181 filed on Apr. 5, 2010.

English translation of Combined Chinese Office Action and Search Report issued Dec. 24, 2013 in Patent Application No. 201080025565.5.

International Search Report issued Jul. 13, 2010 in PCT/JP10/056181 filed Apr. 5, 2010.

* cited by examiner

SPENT FUEL STORAGE RACK

TECHNICAL FIELD

The present invention relates to a spent fuel storage rack for use in accommodating and storing spent fuels removed out of a reactor in a spent fuel storage pool, and particularly to a spent fuel storage rack suitable to densely store spent fuels.

BACKGROUND ART

In a nuclear power plant, in general, after a reactor is operated for a fixed period, a spent fuel removed out of the reactor core is temporarily stored in a spent fuel storage pool before the spent fuel is reprocessed. In the spent fuel storage pool, the spent fuel is subjected to cooling and decay heat removal process.

The spent fuel is stored in a spent fuel storage rack having a grid structure, and such grid structure and layout thereof are determined from the viewpoint of ensuring a subcritical state. Specifically, cells made of boron stainless steel containing boron, which excels in absorbing neutrons, are disposed in a grid pattern, and upper and lower portions of the cells are positioned by using grid-shaped frame plates so as to keep constant the interval between the cells.

In the thus configured spent fuel storage rack of prior art, since the upper and lower grid-shaped frame plates need to withstand any load at the time of earthquake, the spent fuel storage rack has, for example, a structure in which wall plates are provided on the four outer surfaces of the rack to support the upper and lower grid-shaped frame plates, or a structure in which the sides of the upper and lower grid-shaped frame plates that face pool walls are connected to the pool walls and the sides of the upper and lower grid-shaped frame plates that face an adjacent spent fuel storage rack are connected to the corresponding sides of the adjacent rack to support the upper and lower grid-shaped frame plates.

Furthermore, in a conventional technology, as a neutron absorber, boron stainless steel having a boron density of about 1% or lower is utilized, and each cell made of the boron stainless steel has been a pipe formed in a drawing or welding process.

PRIOR ART DOCUMENT

Patent Document

Patent Document 1: Japanese Patent Laid-Open Publication No. 2008-196971
Patent Document 2: Japanese Patent Laid-Open Publication No. 2007-024609

DISCLOSURE OF THE INVENTION

Problems to be Solved by the Invention

In the conventional technology, to densely store fuels, a method of packing fuel bundles is, for example, improved in some cases to effectively increase the capacity of the spent fuel storage pool (reracking). In this case, however, acceptable load limitation of the bottom of the pool often limits the weight of the spent fuel storage rack. In a spent fuel storage rack of the prior art, reinforcing wall plates provided on the four outer surfaces of the rack increase the weight of the rack, thus being disadvantageous.

Further, when the sides of the upper and lower grid-shaped frame plates that face the pool walls are connected to the pool walls and the sides of the upper and lower grid-shaped frame plates that face an adjacent spent fuel storage rack are connected to the corresponding sides of the adjacent rack to thereby support the upper and lower grid-shaped frame plates, the upper and lower grid-shaped frame plates are connected to the pool walls after the spent fuel storage racks have been installed in the pool, which results in a connection work in a narrow space in water, necessity to precisely perform centering working to the upper and lower grid-shaped frame plates and also in causing of other installation-related difficulties, thus being disadvantageous.

Further, in order to meet a demand for extremely dense fuel storage, although it may be conceivable to increase the boron density to about 2%, in such case, the boron-containing material becomes fragile as the boron density increases, which prevents bending and welding from being performed and makes it difficult to manufacture a cell having a conventional structure.

The present invention has been conceived in consideration of the circumstances described above, and an object of the present invention is to provide a spent fuel storage rack that has a high rigidity, can withstand an earthquake-induced load, does not need to provide wall plates, functioning as a conventional earthquake-proof members of related art, on the outer surface of the rack; makes it lightweight while providing with a necessary rigidity, and can be installed as an independent spent fuel storage rack unit to simplify the installation.

Means for Solving the Problem

The above and other objects can be achieved according to the present invention by providing a spent fuel storage rack that accommodates and stores spent fuels in a large number of cells formed in a grid pattern, the spent fuel storage rack comprising: a flat rectangular plate-shaped base that forms a bottom of the rack; columnar members that extend upward from four corners of the base; and at least a pair of upper and lower grid-shaped frame plates disposed above the base and fixed to and supported by the columnar members, wherein each of the cells is formed by assembling metal plates to which boron is added to a density greater than 1% into a polygonal tube, and the cells are arranged contiguously at fixed intervals in the grid-shaped frame plates.

In a preferred embodiment of the spent fuel storage rack of the feature mentioned above, the following modes or examples may be employed.

It may be desired that each of the cells is formed by assembling metal plates to which boron is added to a density greater than 1% in a manner such that protrusions extending from ends of the metal plates are detachably engaged with grooves provided in the ends of the metal plates.

It may be desired that each of the cells is formed by: assembling four flat plates each of which is formed of a stacked plate obtained by stacking a stainless steel plate on an outer surface of a high boron density stainless steel plate having a density greater than 1% in such a way that ends of the flat plates are engaged with each other; positioning a slit provided at each end of each of the stacked plates and a protrusion corresponding to the slit so that the protrusion is fitted into the slit; and welding a corner at which front end portions protruding from each of the fitted portions intersect each other. Further, it may be also desired that a part of each of the stainless steel plates is cut off so as to expose an outer surface of the corresponding boron stainless steel plate.

It may be desired that the stainless steel plates are disposed only at four locations on outer surfaces of portions where the boron stainless steel plates intersect each other.

It may be desired that the spent fuel storage rack according to claim 1, wherein a structure of each of the cells is fixed by: externally covering sideward extending end portions that protrude outward from a portion where each adjacent pair of the boron stainless steel plates intersect each other with a vertically elongated bar having slits extending in an vertical direction; and fitting the portion where the pair of boron stainless steel plates intersect each other into the slits in the bar.

It may be desired that sideward extending end portions of each adjacent pair of the boron stainless steel plates are positioned to intersect each other, protrusions formed at the sideward extending end portions are fitted into slits formed in the pair of boron stainless steel plates, slits are provided in protrusions formed at four corners at which the boron stainless steel plates intersect each other, and disengagement preventing members are inserted into the slits.

It may be desired that each of the disengagement preventing members has a wedge structure or a caulk structure, ends of each adjacent pair of the boron stainless steel plates are formed to provide a comb-shaped structure to be engaged with each other, and L-shaped or box-shaped columns are placed outside the corners of each of the cells and bonded to each other with connection members.

It may be desired that each of the disengagement preventing members has a caulk structure, and ends of each adjacent pair of the boron stainless steel plates are formed to provide a comb-shaped structure to be engaged with each other.

It may be desired that both ends of each adjacent pair of the boron stainless steel plates provide a comb-shaped structure to be engaged with each other is, columns having an L-shaped cross-section are provided outside corners of each of the cells, and the L-shaped columns adjacent to each other are bonded to each other with a connection member.

Effects of the Invention

According to the present invention having the features described above, the grid-shaped frame plates can be supported by the columnar members extending upward from the four corners of the rectangular plate-shaped base, and the spent fuel storage rack is provided with rigidity by supporting the plurality of rectangular cylindrical frames in adjacent arrangement to the cells in the grid-shaped frame plates. As a result, the spent fuel storage rack can withstand earthquake-induced loads and others, ensures rigidity necessary for the spent fuel storage rack, and reduces the weight thereof without providing the wall plates, which are conventional earthquake-proof members, on the outer surfaces of the rack.

Furthermore, since the columnar members, which fix and support the grid-shaped frame plates, provide the frame plates with rigidity, the spent fuel storage rack does not need to be connected to the pool walls, another adjacent spent fuel storage rack, or other structural components, and the spent fuel storage rack can be installed as an independent spent fuel storage rack unit, simplifying the installation thereof.

Still furthermore, since the cells formed in the rack are formed by assembling flat, boron stainless steel plates or any other suitable metal plates, undesired bending or welding working can be eliminated and the boron density can be increased.

EMBODIMENT FOR CARRYING OUT THE INVENTION

Embodiments of a spent fuel storage rack according to the present invention will be described below with reference to the drawings. Further, it is to be noted that, in the following description, the terms "upper," "lower," "right," "left," and other direction-related terms are used with reference to the illustration of the drawings or an actual attitude of the spent fuel storage rack installed with the bottom thereof set horizontal.

[First Embodiment (FIGS. 1 to 3)]

Figure 1:
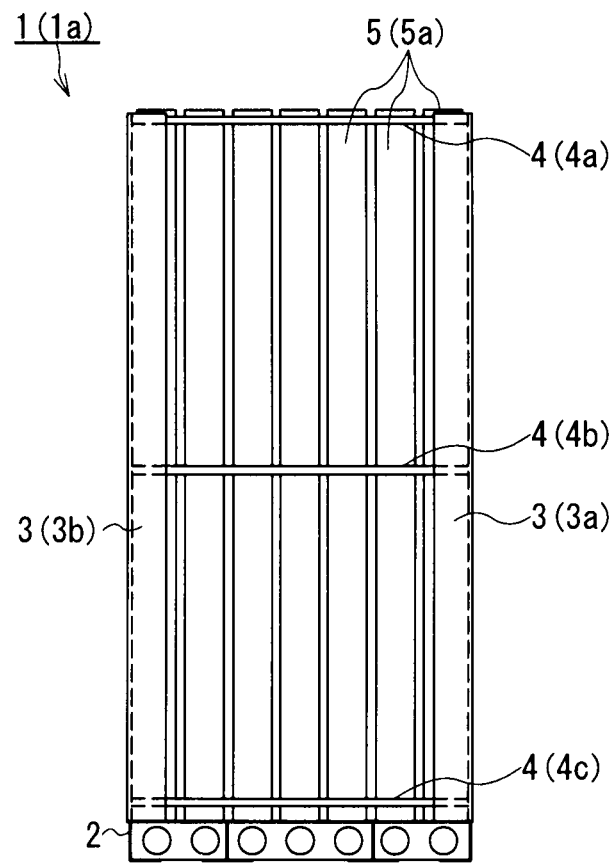
FIG. 1 is an illustration of an entire structure of a spent fuel storage rack according to a first embodiment of the present invention.
Figure 2:
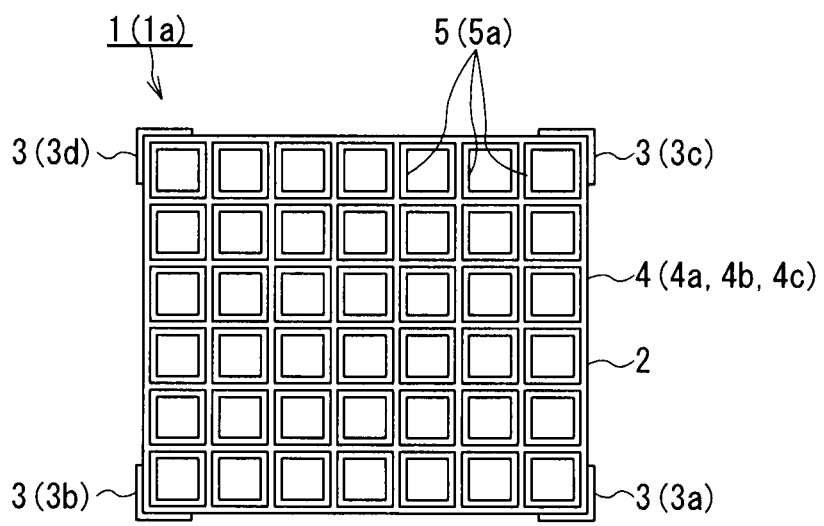
FIG. 2 is a plan view showing the structure of the spent fuel storage rack shown in FIG. 1.

FIG. 1 is an entire side view showing the structure of a spent fuel storage rack 1 (1a) according to a first embodiment of the present invention, and FIG. 2 is a plan view of the spent fuel storage rack shown in FIG. 1.

The spent fuel storage rack 1 (1a) according to the present embodiment includes a base 2 that forms the bottom of the rack as shown in FIGS. 1 and 2. The base 2 is made, for example, of stainless steel and has a flat, rectangular, thin box-like shape and made strong enough to withstand the load resulting from mounted spent fuels, load during transportation or like and other loads.

Four columnar members 3 (3a, 3b, 3c, and 3d) made of stainless steel are provided at the four corners of the base 2 so as to extend upward to same height level. Each of the columnar members 3 (3a, 3b, 3c, and 3d), for example, has an L-like cross-sectional shape, and the columnar members 3a, 3b, 3c, and 3d are so disposed that the concave, interior angle side of each of the L-shaped angled portions faces the concave, interior angle side of the corresponding one in the diagonal direction. The lower ends of the columnar members 3a, 3b, 3c, and 3d are disposed at peripheral angled portions of the base 2 and welded or otherwise fixed to the base 2.

An upper frame plate 4a, a middle frame plate 4b and a lower frame plate 4c are disposed at the upper end, a middle position that is substantially the center in the vertical direction, and the lower end of the columnar members 3 (3a, 3b, 3c, and 3d). The upper frame plate 4a, the middle frame plate 4b, and the lower frame plate 4c, which are collectively called grid-shaped frame plate(s) 4, are horizontally oriented and fixed to and supported by the columnar members 3.

The upper frame plate 4a is formed by assembling horizontally elongated stainless steel plates in a square frame in such a way that the stainless steel plates intersect each other at fixed intervals in rows and columns in a square grid pattern. The upper frame plate 4a allows a large number of square cells 5, each of which is hollow in the vertical direction, to be arranged contiguously. The four corners of the upper frame plate 4a are in contact with the inner surfaces of the L-shaped, upper end angled portions of the columnar members 3a, 3b, 3c, and 3d and welded or otherwise fixed to and supported by the columnar members 3.

The middle frame plate 4b is formed by assembling horizontally elongated stainless steel plates in a square frame in such a way that the stainless steel plates intersect each other in rows and columns in a grid pattern, as in the case of the upper frame plate 4a. The thus configured middle frame plate 4b works as a square-grid frame having the large number of cells 5 arranged contiguously at the fixed intervals and has a large number of contiguously arranged square holes that communicate in the vertical direction with the square holes in the upper frame plate 4a.

The lower frame plate 4c is also formed by assembling horizontally elongated stainless steel plates in a square frame in such a way that the stainless steel plates intersect each other at fixed intervals in rows and columns in a square grid pattern, as in the case of the upper frame plate 4a. The thus configured lower frame plate 4c also has a large number of contiguously arranged square holes that communicate in the vertical direction with the square cells 5 in the upper frame plate 4a.

The four corners of the middle frame plate 4b and the lower frame plate 4c are also in contact with the inner surfaces of the L-shaped, middle angled portions located substantially at the center in the vertical direction and the L-shaped lower end angled portions of the columnar members 3a, 3b, 3c, and 3d and welded or otherwise fixed to and supported by the columnar members 3.

As described above, the spent fuel storage rack 1 (1a) according to the present embodiment has the structure including: the flat rectangular plate-shaped base 2, which forms the bottom of the rack; the columnar members 3 (3a, 3b, 3c, and 3d) arranged at the four corners of the base 2 so as to extend vertically therefrom; and the frame plates 4 including the upper frame plate 4a, the middle frame plate 4b and the lower frame plate 4c, which are supported by the columnar members 3 and disposed above the base 2. The rack 1 (1a) thus has a large number of vertically elongated cells 5, each of which has an upper opening and a rectangular shape in a plan view, arranged contiguously at fixed intervals in the horizontal direction.

The structure described above according to the present embodiment, the columnar members 3, which extend upward from the four corners of the rectangular plate-shaped base 2 can support the grid-shaped frame plates 4 (4a, 4b, and 4c) adjacent to each other, thus providing rigidity. As a result, the spent fuel storage rack according to the present embodiment can withstand earthquake-induced loads and other loads, ensures rigidity necessary for the spent fuel storage rack and reduces the weight thereof without the need to provide wall plates, which are conventional earthquake-proof members, on the outer surfaces of the rack.

Further, since the columnar members 3, which fix and support the grid-shaped frame plates 4 (4a, 4b, and 4c), provide the grid-shaped frame plates 4 with rigidity, the spent fuel storage rack 1 does not need to be connected to pool walls, another adjacent spent fuel storage rack, or other structural components, and can be installed as an independent spent fuel storage rack unit, thereby simplifying the installation working thereof.

Moreover, since the cells 5 formed in the rack are formed by assembling flat, boron stainless steel plates, undesired bending or welding workings be eliminated and the boron density can be increased.

Figure 3A:
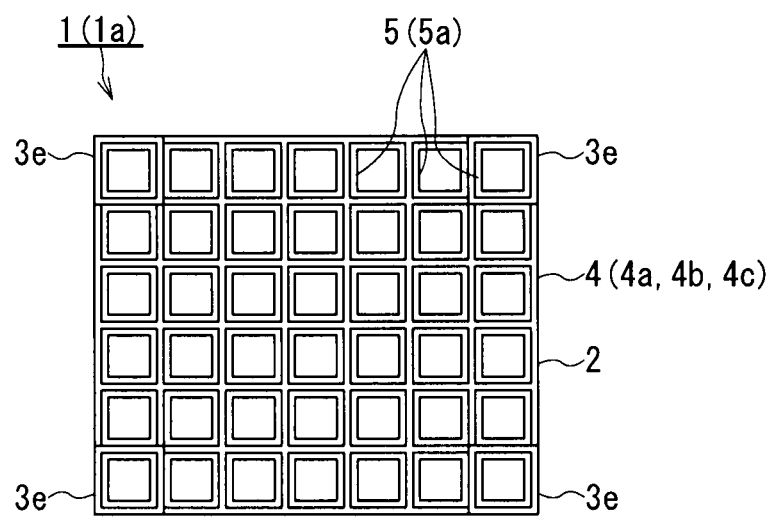
FIG. 3A is a plan view showing a modified embodiment showing the structure of the rack shown in FIG. 2.
Figure 3B:
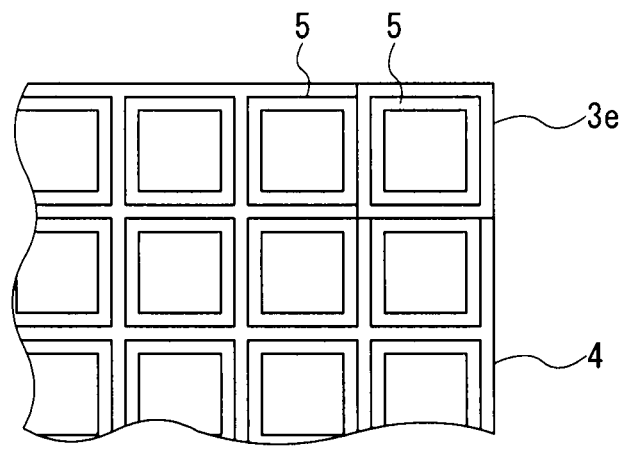
FIG. 3B is an enlarged view showing a part of the structure of FIG. 3A.

FIG. 3 shows a modification (modified embodiment) of the first embodiment. FIG. 3A is a plan view showing the configuration of a rack, and FIG. 3B is an enlarged view showing a part of the rack shown in FIG. 3A in detail.

As shown in FIGS. 3A and 3B, in this modification, each columnar member 3e, which extends upward from the corresponding one of the four corners of the frame plates 4 of a spent fuel storage rack 1 (1b), is a hollow, vertically elongated, rectangular tube having a square cross-sectional shape.

Each of the four columnar members 3e has an open upper end and a rectangular space so as to accommodate the corresponding cell 5. Further, the outer surface of each of the columnar members 3e is flush with the outer surface of the grid-shaped frame plates 4 (upper frame plate 4a, middle frame plate 4b, and lower frame plate 4c).

According to the structure described above, each of the cells 5 into which each spent fuel can be inserted through the opening of each of the columnar member 3e is accommodated therein. The same number of cells as in the embodiment shown in FIGS. 1 and 2 can be formed without influencing the number of the spent fuel in each unit of the spent fuel storage rack 1b.

Figure 4:
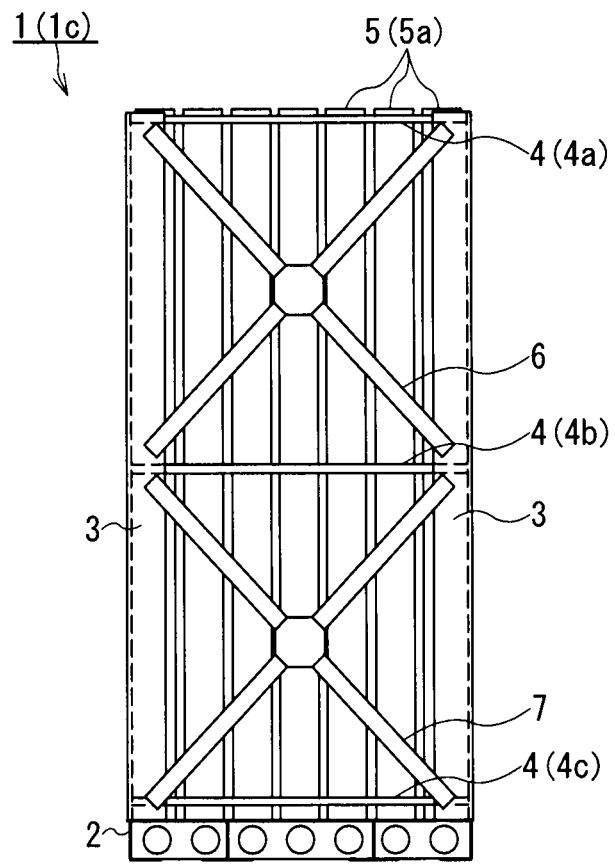
FIG. 4 is an illustration of an entire structure of a spent fuel storage rack according to another modified embodiment showing the structure of the rack of the first embodiment of the present invention.

FIG. 4 shows an entire structure of another modification (modified embodiment) of the spent fuel storage rack according to the first embodiment.

As shown in FIG. 4, a spent fuel storage rack 1 (1c) is basically configured substantially in the same manner as the spent fuel storage rack shown in FIGS. 1 to 3. The spent fuel storage rack 1 (1c) differs from the spent fuel storage rack shown in FIGS. 1 to 3 in that reinforcing beams 6 and 7 are provided on the outer side surfaces of the rack.

That is, in the example shown in FIG. 4, the reinforcing beams (upper reinforcing beams) 6 are disposed across a portion between the upper end of the outer side surface of each of the columnar members 3 and a middle position thereof in the vertical direction with the reinforcing beams 6 inclined to the vertical direction (intersecting each other like crossed belts, for example). Similarly, the reinforcing beams (lower reinforcing beams) 7 are disposed across a portion between the lower end of each of the columnar members 3 and the middle position thereof in the vertical direction.

As mentioned above, by providing the reinforcing beams 6 and 7 on the outermost side surfaces of the columnar members 3 and the rectangular tubular frame plates 4 in an inclined manner, the columnar member 3 and the frame plates 4 can be reinforced from the portion from both angled portions of the lower end of each of the columnar members 3 and the frame plates 4 to the middle position thereof in the vertical direction and the portion between the middle position in the vertical direction and the upper end of each of the columnar members 3 and the frame plates 4.

Therefore, since the reinforcing beams 7 are disposed in the space formed by the frame plates 4, the columnar members 3, and the base 2 and bonded to each other, necessary rigidity of the rack can be ensured and the weight thereof can be also reduced as compared with a conventional structure in which wall plates are provided on the four outer surfaces.

According to the first embodiment described above, since the columnar members 3 extending upward from the four corners of the rectangular plate-shaped base 2 supports, the grid-shaped frame plates 4, the cells 5 in the grid-shaped frame plates 4 support the plurality of rectangular tubular frames adjacent to each other, whereby the rack is provided with rigidity.

As a result, the spent fuel storage rack can withstand earthquake-induced loads and other loads, ensures rigidity necessary for the spent fuel storage rack, and reduces the weight thereof without the need to provide wall plates without disposing the wall plates on the outer surfaces of the fuel spent rack as the conventional earthquake-proof members.

Furthermore, since the columnar members 3, which fix and support the grid-shaped frame plates 4, provide the frame plates 4 with rigidity, the spent fuel storage rack 1 does not need to be connected to the pool walls, another adjacent spent fuel storage rack, or other structural components, and the rack can be installed as an independent spent fuel storage rack unit, thus simplifying the installation working.

Still furthermore, since the cells 5 formed in the rack are formed by assembling flat, boron stainless steel plates, any undesired bending or welding working can be eliminated and the boron density can be increased.

[Second Embodiment (FIGS. 5 and 6)]

Figure 5:
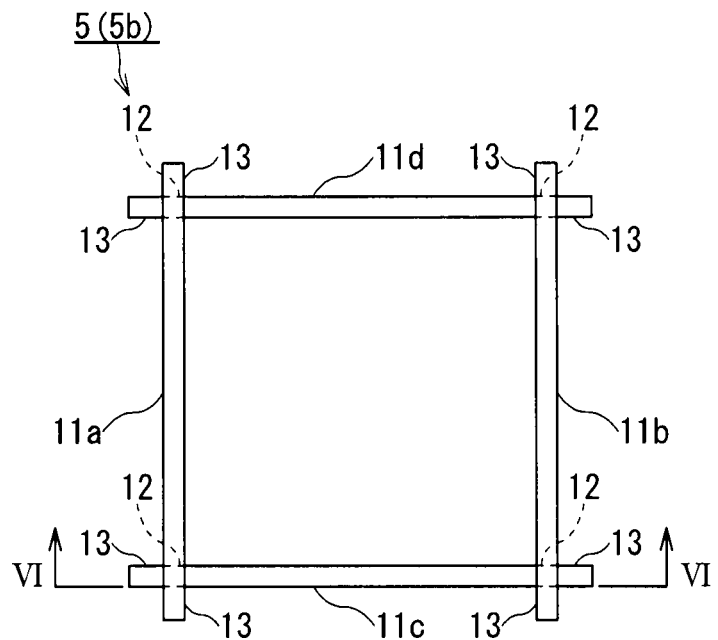
FIG. 5 is an illustrated plan view a structure of a cell in a rack according to a second embodiment of the present invention.
Figure 6:
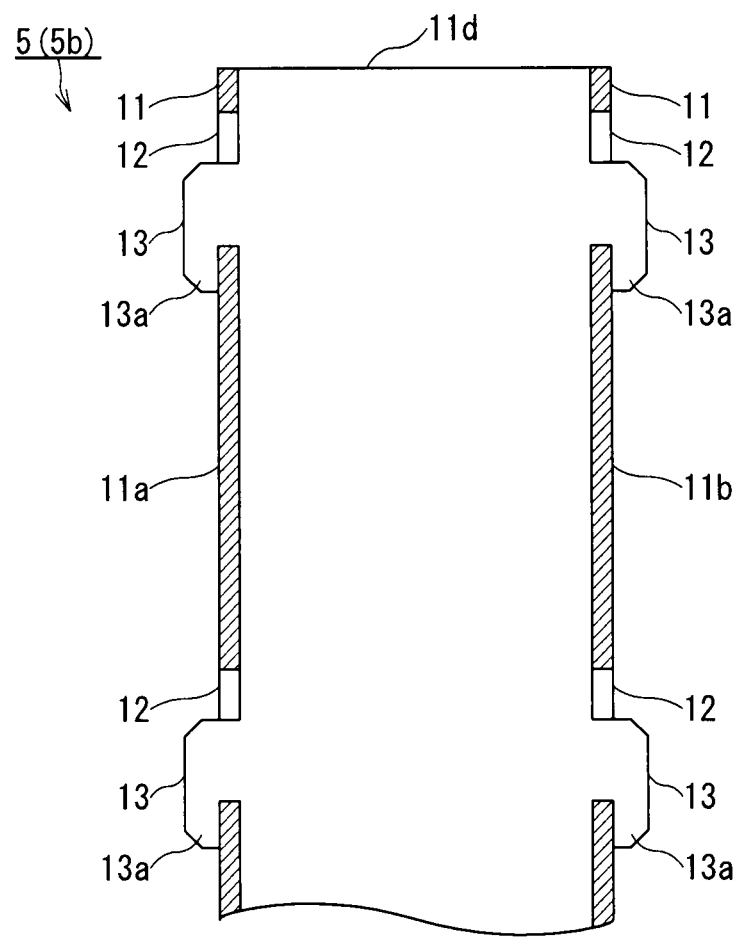
FIG. 6 is a cross-sectional view taken along the line VI-VI shown in FIG. 5.

FIG. 5 is a plan view showing the structure of a cell 5 (5b) in a spent fuel storage rack according to a second embodiment of the present invention. FIG. 6 is a cross-sectional view (longitudinal cross-sectional view) taken along the line VI-VI shown in FIG. 5.

As shown in FIGS. 5 and 6, the cell 5 (5b) in the present embodiment is formed by assembling four vertically elongated rectangular flat plates 11 (11a, 11b, 11c, and 11d) made of boron stainless steel having a high boron density greater than 1% in a double-cross pattern with each pair of flat plates 11 facing each other.

That is, a pair of flat plates 11a and 11b are arranged to face each other in one direction, and the other pair of flat plates 11c and 11d are also arranged to face each other in the direction perpendicular to the direction in which the pair of flat plates 11a and 11b face each other.

A plurality of vertically elongated slits 12 are formed in each of the flat plates 11a and 11b facing each other. Specifically, the slits 12 are formed, for example, in upper and lower end portions of the flat plates 11a and 11b and in a middle portion in the vertical direction, and the slits 12 are arranged in the vertical direction along the center line in the width direction of the flat plates 11a and 11b.

On the other hand, locking protrusions (projections) 13, each of which is formed of a comb-like bracket having a burred portion 13a at the tip thereof, are formed along both edges of each of the flat plates 11c and 11d, which are perpendicular to the flat plates 11a and 11b and form L-like shapes in a side view. The locking protrusions 13 are positioned so as to face the slits 12.

The flat plates 11a, 11b, 11c, and 11d are assembled in a double-cross pattern by positioning the pair of flat plates 11a and 11b facing each other and having the slits 12 formed therein and the pair of flat plates 11c and 11d facing each other and having the locking protrusions 13 formed thereon in a manner such that the two pairs of flat plates 11 face each other and detachably inserting the locking protrusions 13 having the burred tip portions 13a into the respective slits 12 so that the flat plates 11 are locked. The cell 5 (5b) is thus formed.

According to the present embodiment, the cell 5 (5b) formed of boron stainless steel plates having a high boron density can be reliably formed by assembling the flat plates 11a and 11b having the slits 12 formed therein and the flat plates 11c and 11d having the locking protrusions 13 formed thereon in a double-cross pattern with the locking protrusions 13 inserted into the slits 12.

[Third Embodiment (FIGS. 7 and 8)]

Figure 7:
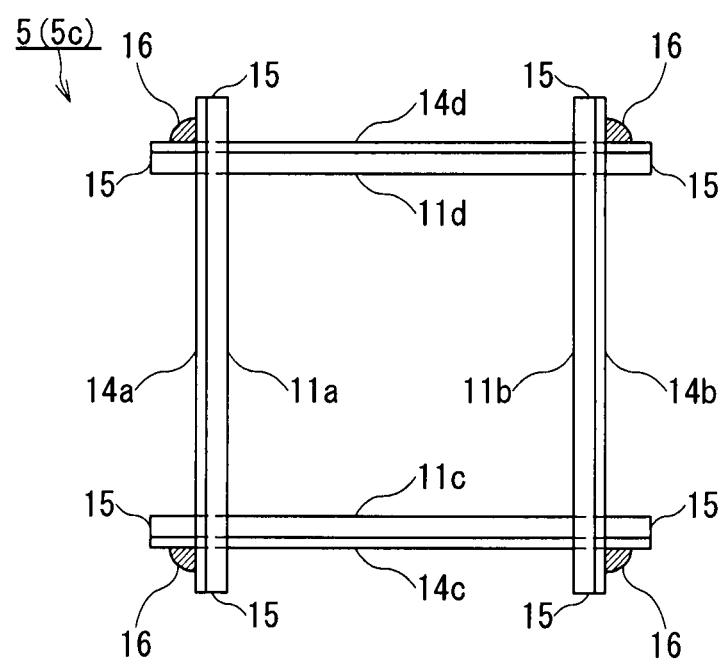
FIG. 7 is an illustrated plan view showing a structure of a cell in a rack according to a third embodiment of the present invention.
Figure 8:
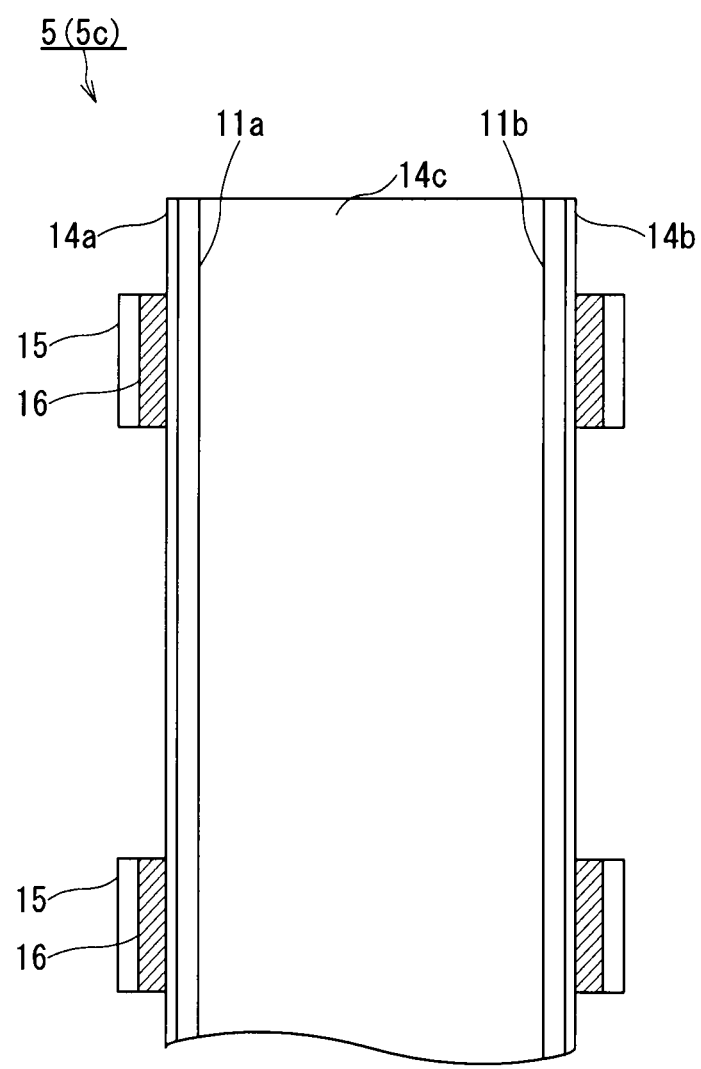
FIG. 8 is a side view showing the structure of the cell shown in FIG. 7.

FIG. 7 is a plan view showing the structure of a cell in a spent fuel storage rack according to a third embodiment of the present invention. FIG. 8 is a side view of the rack shown in FIG. 7.

As shown in FIGS. 7 and 8, a cell 5 (5c) in the present embodiment is formed by assembling stacked plates in a double-cross pattern in such a way that the stacked plates intersect each other in rows and columns. The stacked plates are formed by stacking boron stainless steel plates 11 (11a, 11b, 11c, and 11d) having a high boron density and stainless steel plates 14 (14a, 14b, 14c, and 14d) on each other.

That is, in the present embodiment, on the outer surfaces of the four boron stainless steel flat plates 11a, 11b, 11c, and 11d having a high boron density, which will be then assembled in a double-cross pattern, are stacked the outer stainless steel plates 14a, 14b, 14c, and 14d. The four stacked plates are assembled in a double-cross pattern into a rectangular tubular frame.

Both ends of each of the outer stainless steel plates 14a, 14b, 14c, and 14d protrude outward beyond the rectangular tubular portion, and outer angled portions of the corners where protrusions 15 of the outer plates 14a, 14b, 14c, and 14d interest each other are bonded with corner welding (welded) portions 16.

As described above, the cell 5 (5c) in the present embodiment is formed by bonding the protrusions, which are provided at both ends of each of the stacked stainless steel plates obtained by stacking a stainless steel plate on the outer surface of a high boron density stainless steel plate, with the corner welding portions 16.

According to the present embodiment, the cell 5c formed of boron stainless steel plates having a high boron density has a grid-shaped structure based on the stacked plates formed of the boron stainless steel plates 11 (11a, 11b, 11c, and 11d) having a high boron density and the stainless steel plates 14 (14a, 14b, 14c, and 14d). The resultant cell is provided with high rigidity.

[Fourth Embodiment (FIG. 9)]

Figure 9:
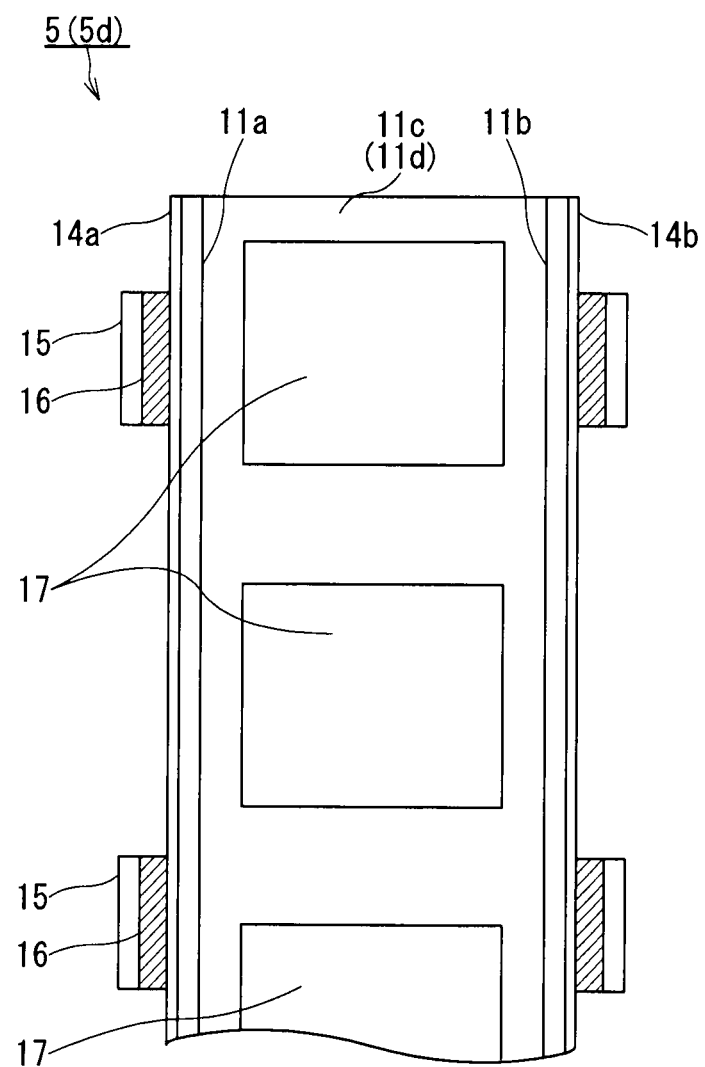
FIG. 9 is a side view showing the structure of a cell in a rack according to a fourth embodiment of the present invention.

FIG. 9 is a side view showing the structure of a cell 5 (5d) in a spent fuel storage rack according to a fourth embodiment of the present invention.

The cell 5 (5d) in the present embodiment has substantially the same overall configuration as that of the cell in the third embodiment. That is, each cell is formed by stacking the outer stainless steel plates 14a, 14b, 14c, and 14d on the outer surfaces of the boron stainless steel flat plates 11a, 11b, 11c, and 11d having a high boron density and assembling the stacked plates in a double-cross pattern.

The cell 5 (5d) in the present embodiment differs from the cell in the third embodiment in that a part of each of outer stainless steel plates 14a, 14b, 14c, and 14d is cut off and holes (through holes) 17 are drilled through the side walls of the cell 5 (5d) in the in-out direction.

Specifically, as shown in FIG. 9, a part of outer stainless steel plates 14a to 14d is cut off, and a plurality of rectangular through holes 17 are formed and arranged in the vertical direction. The shape, the number, the layout, and other features of the through holes 17 may be changed in a variety of ways as occasion demands.

According to the present embodiment, since the through holes 17 are formed through the outer stainless steel plates 14a, 14b, 14c, and 14d, the weight of the flat plates can be reduced, thereby also reducing the weight of the entire cell 5 (5d).

[Fifth Embodiment (FIGS. 10 and 11)]

Figure 10:
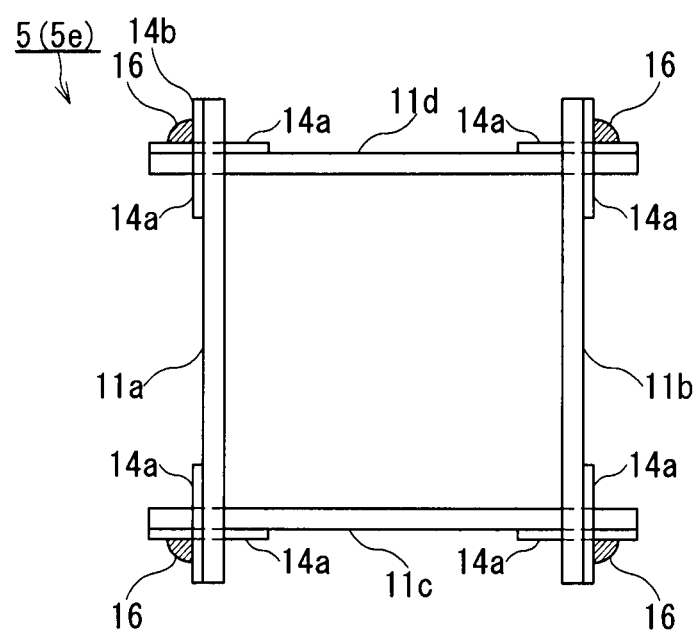
FIG. 10 is a plan view showing the structure of a cell in a rack according to a fifth embodiment of the present invention.
Figure 11:
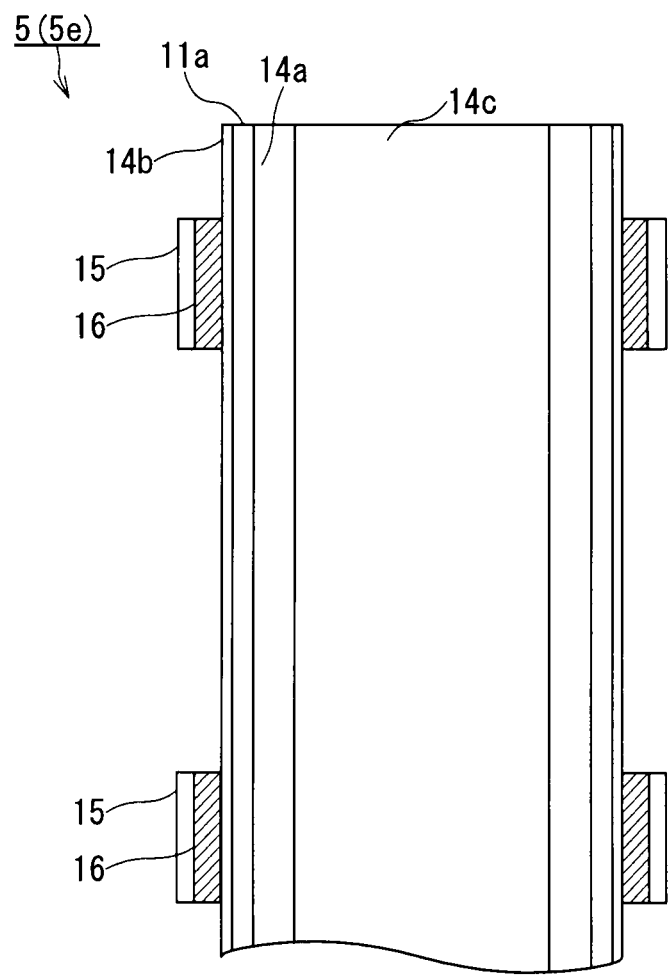
FIG. 11 is a side view showing the cell shown in FIG. 10.

FIG. 10 is a plan view showing the structure of a cell 5 (5e) in a spent fuel storage rack according to a fifth embodiment of the present invention, and FIG. 11 is a side view of the cell 5 shown in FIG. 10.

The cell 5 (5e) in the present embodiment has substantially the same structure in an assembled state as that in the fourth embodiment, and description concerning the entire structure of the cell 5 (5e) is omitted herein.

The present embodiment differs from the fourth embodiment in that stainless steel flat plates 14a to 14d have a smaller width and are placed only at four locations on the outer surfaces where the boron stainless steel flat plates 11a, 11b, 11c, and 11d intersect each other, and only the intersecting portions are fixed with corner welding portions 16.

That is, in the present embodiment, the stainless steel flat plates 11a and 11b, which form the cell 5 (5e), are placed only at the four intersecting portions and welded and fixed to each other. In this way, the width of each of the outer flat plates 14a to 14d made of stainless steel is reduced, and no stainless steel plate is disposed on each of the boron stainless steel flat plates 11a, 11b, 11c, and 11d in a central portion thereof in the width direction. Thus, the weight of the stainless steel flat plates 14a to 14d is reduced.

According to the present embodiment, a part of the outer flat plates 11a and 11b made of stainless steel is cut off, and the stainless steel flat plates 11a and 11b, which form the cell 5, are placed only at the four intersecting portions, whereby the weight of the outer stainless steel flat plates 14a to 14d, and hence, the weight of the entire cell 5 (5e) can be reduced for further weight reduction.

[Sixth Embodiment (FIG. 12)]

Figure 12:
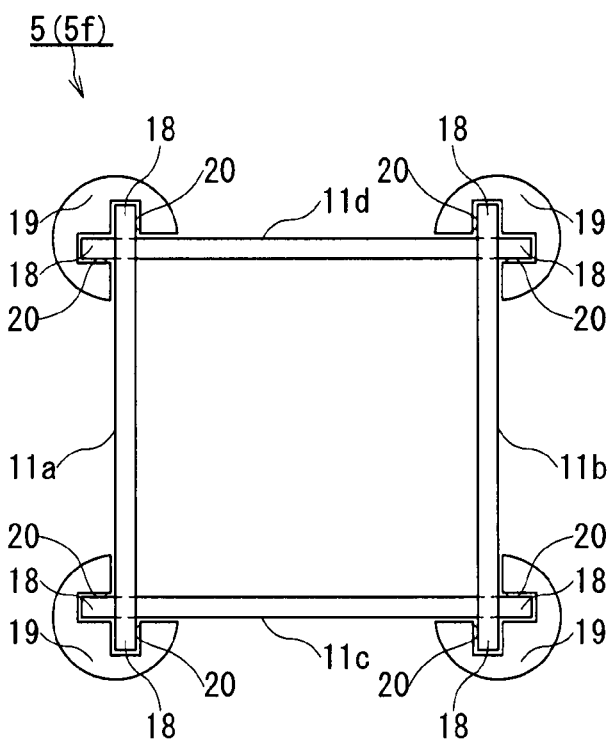
FIG. 12 is a plan view showing the structure of a cell in a rack according to a sixth embodiment of the present invention.

FIG. 12 is a plan view showing the structure of a cell 5 (5f) in a spent fuel storage rack according to a sixth embodiment of the present invention.

The cell 5 (5f) in the present embodiment is formed by assembling four flat plates 11a, 11b, 11c, and 11d made of high boron density stainless steel in a double-cross pattern, as shown in FIG. 12. That is, the ends of the four flat plates 11a, 11b, 11c, and 11d intersect each other at right angles, and sideward protruding ends of each of the intersecting portions form horizontal protrusions 18 extending outward by a fixed length.

Four vertically elongated cutout bars 19 are provided so as to cover front end surfaces of the protrusions 18. Each of the cutout bars 19 is formed, for example, by cutting off a circumferentially quarter (90-degree) area of a cylinder throughout the length of the cylinder. Vertical groove-shaped slits 20, 20 are formed in the 90-degree angled cut-off surfaces of each of the cutout bars 19, and the front portions of the high boron density stainless steel flat plates 11a, 11b, 11c, and 11d are inserted into the slits 20, 20 and fitted therein.

As described above, in the present embodiment, the sideward protruding ends extending outward from each of the intersecting portions at which the boron stainless steel flat plates 11 intersect each other are externally covered with the vertically elongated cutout bar 19 having the slits 20 extending in the vertical direction. Further, each of the intersecting portions at which the boron stainless steel flat plates 11 intersect each other is fitted into the slits 20 in the cutout bar 19. The structure of the cell is thus fixed, and a spent fuel storage rack is formed based on the cell.

According to the present embodiment, by using the cutout bars 19 to hold the boron stainless steel flat plates 11, the cell 5f formed of the boron stainless steel plates, having high boron density, is constructed as a strong cell.

[Seventh Embodiment (FIG. 13)]

Figure 13:
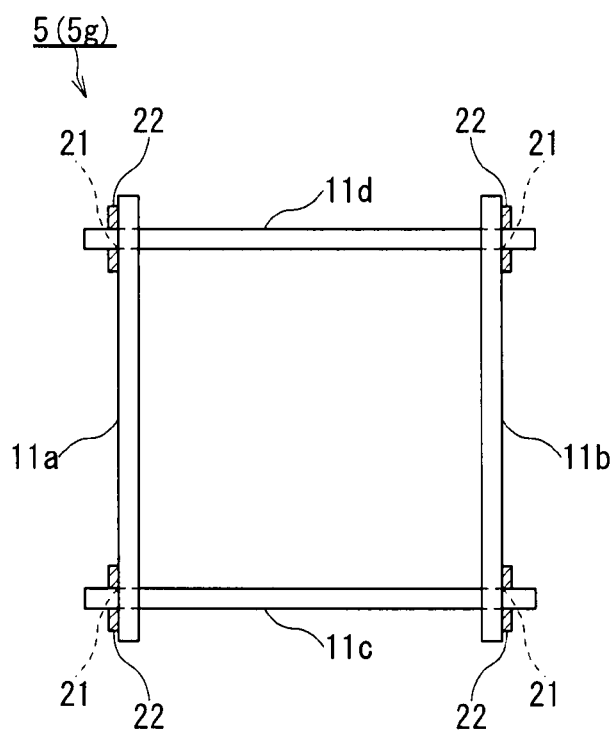
FIG. 13 is a plan view showing the structure of a cell in a rack according to a seventh embodiment of the present invention.

FIG. 13 is a plan view showing the structure of a cell 5 (5g) in a spent fuel storage rack according to a seventh embodiment of the present invention.

In the present embodiment, as shown in FIG. 13, the cell 5 (5g) is formed by assembling four flat plates 11a, 11b, 11c, and 11d, each of which is made of high boron density stainless steel and has a comb-like shape, in a double-cross pattern. That is, each of the four boron stainless steel flat plates 11a, 11b, 11c, and 11d has sideward extending end portions having a comb-like shape, and the flat plates 11a, 11b, 11c, and 11d are assembled in a double-cross pattern by engaging the comb-shaped portions of the flat plates 11a, 11b, 11c, and 11d adjacent to each other.

Slits 21 are formed along both edges of one pair of flat plates 11c and 11d facing each other in one direction, and wedge-shaped disengagement preventing members 22 are inserted into the slits 21. In this way, the other pair of flat plates 11a and 11b, which intersect the flat plates 11c and 11d, are pressed from both sides and fixed.

As described above, in the present embodiment, the cell 5 (5g) is formed by combining the flat plates 11a and 11b made of high boron density stainless steel into a double cross-shaped rectangular tube and inserting the disengagement preventing members 22 into the slits 21 provided in the comb-shaped portions formed at the protrusions of the four intersecting corners.

According to the present embodiment, the protrusions provided at an end of a boron stainless steel plate are fitted into slits provided in the adjacent boron stainless steel plate. The slits are provided in the protrusions formed at the four intersecting corners, and the disengagement preventing members are inserted into the slits. Therefore, the cell 5 can provide a stable grid-like shape.

[Eighth Embodiment (FIG. 14)]

Figure 14:
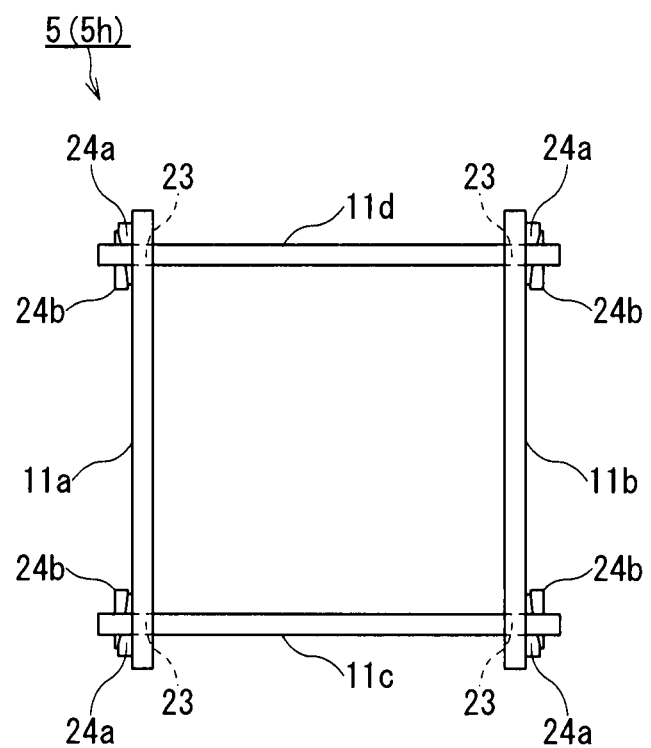
FIG. 14 is a plan view showing the structure of a cell in a rack according to an eighth embodiment of the present invention.

FIG. 14 is a plan view showing the structure of a cell 5 (5h) in a spent fuel storage rack in which the disengagement preventing members shown in FIG. 13 are replaced with wedges.

In the present embodiment, as shown in FIG. 14, wedges 24a and 24b are used as the disengagement preventing members, and the wedges 24a and 24b are so configured that they unlikely disengage.

Specifically, boron stainless steel flat plates 11a, 11b, 11c, and 11d having a high boron density are combined into a double cross-shaped rectangular tube. Slits 23 are formed to protrusions extending from each of the four intersecting corners. A pair of wedges 24a and 24b are inserted as the disengagement preventing members into each of the slits 23. Thus, the boron stainless steel flat plates 11a, 11b, 11c, and 11d having high boron density are securely fixed. A caulk structure may further added as required.

As described above, in the present embodiment, a wedge structure or a caulk structure is employed, as in the seventh embodiment, in which the disengagement preventing members 22 are provided, and a comb-shaped structure in which ends of the boron stainless steel flat plates 11a, 11b, 11c, and 11d are engaged each other is employed.

The cell 5 (5h) can therefore be formed by assembling the boron stainless steel flat plates 11a, 11b, 11c, and 11d having high boron density and using the wedges 24a and 24b as the disengagement preventing members. Further, after the wedges 24a and 24b are fitted, welding operation may be performed so that the members constituting the cell will not disengage.

[Ninth Embodiment (FIGS. 15 and 16)]

Figure 15:
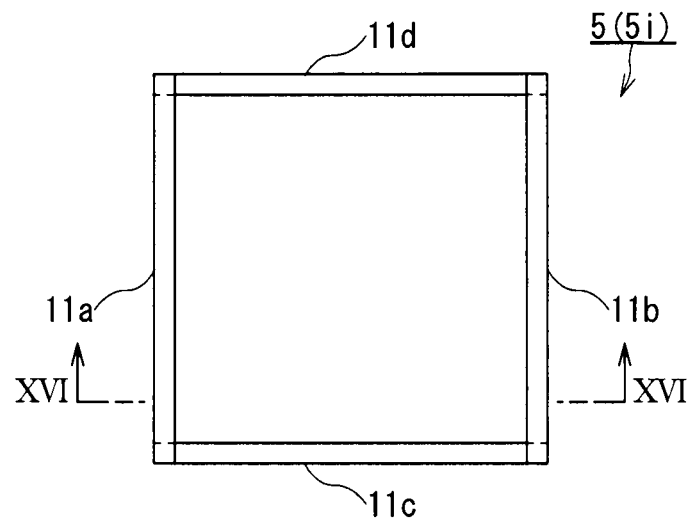
FIG. 15 is a plan view showing the structure of a cell in a rack according to a ninth embodiment of the present invention.
Figure 16:
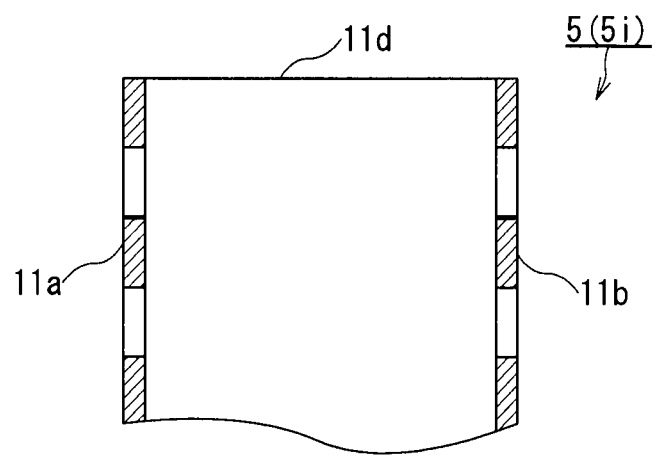
FIG. 16 is a cross-sectional view taken along the line XVI-XVI shown in FIG. 15.

FIG. 15 is a plan view showing the structure of a cell 5 (5i) in a spent fuel storage rack according to a ninth embodiment of the present invention, and FIG. 16 is a longitudinal cross-sectional view taken along the line XVI-XVI shown in FIG. 15.

In the present embodiment, as shown in FIGS. 15 and 16, four boron stainless steel flat plates 11a, 11b, 11c, and 11d having high boron density are combined into a rectangular tube to form the cell 5 (5i).

The cell 5i has a comb-shaped structure in which the flat plates 11a, 11b, 11c, and 11d are assembled with the end of each edge of any of the plates 11 being aligned with the end of the corresponding edge of the adjacent plate 11. The end of each edge of the flat plates 11a, 11b, 11c, and 11d is then bonded to the end of the corresponding edge of the adjacent plate 11 so as to form a hollow, box-shaped column member having a square hole extending in the vertical direction with no protrusion on the outer surface.

As a component for preventing the disengaging of the bonded portion, a caulk structure is adopted to lock the end of each edge of each of the flat plates 11a, 11b, 11c, and 11d.

According to the present embodiment, the structure of the cell is a comb-shaped structure in which the ends of boron stainless steel plates are engaged with each other, and the boron stainless steel flat plates 11a, 11b, 11c, and 11d having a high boron density are assembled into a rectangular tube in such a way that end surfaces thereof having the comb-shaped structure are engaged each other. The resultant cell 5 (5i) formed of the boron stainless steel plates having a high boron density has a vertically elongated box shape with no protrusion on the outer surface.

[Tenth Embodiment (FIGS. 17 and 18)]

Figure 17:
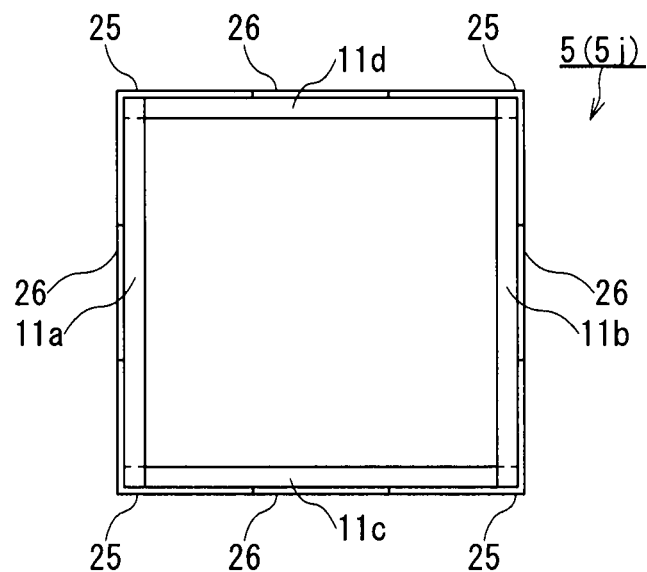
FIG. 17 is a plan view showing the structure of a cell in a rack according to a tenth embodiment of the present invention.
Figure 18:
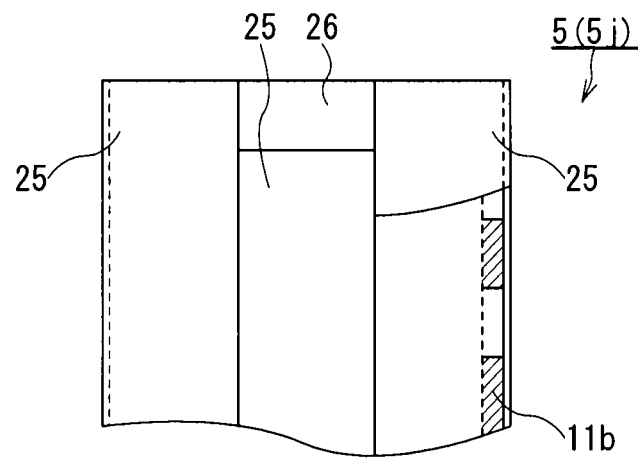
FIG. 18 is a cutaway side view showing part of the configuration shown in FIG. 17.

FIG. 17 is a plan view showing the structure of a cell 5 (5j) in a spent fuel storage rack according to a tenth embodiment of the present invention, and FIG. 18 is a cutaway side view showing a part of the structure shown in FIG. 17.

As shown in FIGS. 17 and 18, the cell 5 (5j) in the present embodiment, which is substantially the same as the cell in the ninth embodiment described above, is formed by combining four boron stainless steel flat plates 11a, 11b, 11c, and 11d having a high boron density into a rectangular tube.

A column 25 having an L-like cross-sectional shape both sides of which are wide is disposed outside each of the corners of the cell 5 (5j) in a manner such that the concave sides of the diagonally opposite columns 25 face each other, and upper and lower end portions of the columns 25 adjacent to each other are bonded with connection members 26.

As described above, the cell 5 (5j) is formed by combining the boron stainless steel flat plates 11a, 11b, 11c, and 11d having a high boron density into a rectangular tube, placing the columns 25 having an L-like cross-sectional shape outside the four corners of the rectangular tube, and bonding each pair of adjacent columns 25 to each other with the connection member 26.

According to the present embodiment, since the cell 5 (5j) is formed by bonding the high boron density stainless steel flat plates 11a, 11b, 11c, and 11d having been assembled into a rectangular tube to the L-shaped columns 25 outside the corners of the rectangular tube with the connection members 26, the resultant cell provides a strongly assembled structure based on the high boron density stainless steel plates.

It is further to be noted that the present invention is not limited to the embodiments described above, and many other changes and modifications may be made without departing from the scopes of the appended claims.

For example, in the embodiments described above, although each cell is formed by assembling boron stainless steel plates having a high boron density greater than 1% into a rectangular tube, the cell may alternatively be formed by assembling metal plates to which boron is added to a density greater than 1% into a polygonal tube instead of a rectangular tube, and the polygonal tube may be arranged contiguously at fixed intervals in the grid-shaped frame described above. In this example, the boron stainless steel plates may be replaced, for example, with metal plates to which boron and aluminum are added.

The invention claimed is:

1. A spent fuel storage rack that accommodates and stores spent fuels in a large number of cells formed in a grid pattern, the spent fuel storage rack comprising:
   a flat rectangular plate-shaped base that forms a bottom of the rack;
   columnar members having an L-like cross sectional shape that extend upward from four corners of the base; and
   at least a pair of upper and lower grid-shaped frame plates disposed above the base and fixed to and supported by inner surfaces of the columnar members, wherein
   each of the cells includes four flat plates, made of high boron content stainless steel having a boron density greater than 1%, assembled into a rectangular tube,
   the cells are arranged contiguously at fixed intervals in the grid-shaped frame plates,
   the four flat plates each include first slits and locking protrusions formed thereon, the locking protrusions are inserted into the first slits such that ends of each adjacent pair of the four flat plates that intersect each other at right angles, the locking protrusions of the ends of each adjacent pair of the four flat plates that intersect each other protrude outward by a common length beyond the intersection of the adjacent pair, and the locking protrusions are detachably engaged with the first slits such that, when the locking protrusions are engaged with the first slits, portions of the locking protrusions extend below the first slits and inward facing surfaces of the extended portions abut outward facing surfaces of the four flat plates below the first slits.

2. The spent fuel storage rack according to claim 1, wherein the four flat plates are each formed of a stacked plate obtained by stacking a stainless steel plate on an outer surface of a high boron content stainless steel plate having a boron density greater than 1%; and each of the cells includes a weld at a corner at which the locking protrusions protrude.

3. The spent fuel storage rack according to claim 2, wherein a part of each of the stainless steel plates is cut off so as to expose an outer surface of the corresponding boron stainless steel plate.

4. The spent fuel storage rack according to claim 2, wherein the stainless steel plates are disposed only at four locations on outer surfaces of portions where each adjacent pair of the boron stainless steel plates intersect each other.

5. The spent fuel storage rack according to claim 1, further comprising:

a vertically elongated bar having recesses extending in a vertical direction that engages two locking protrusions of adjacent plates, wherein the common length of the two locking protrusions that protrude beyond the intersection of the adjacent plates are received in the recesses in the bar.

6. The spent fuel storage rack according to claim 1, wherein second slits are provided in the locking protrusions and are disposed at four corners at which each adjacent pair of the four flat plates intersect each other, and disengagement preventing members are inserted into the second slits.

* * * * *